I. C. WOODWARD.
NUT LOCK.
APPLICATION FILED FEB. 13, 1919.
1,368,087.
Patented Feb. 8, 1921.
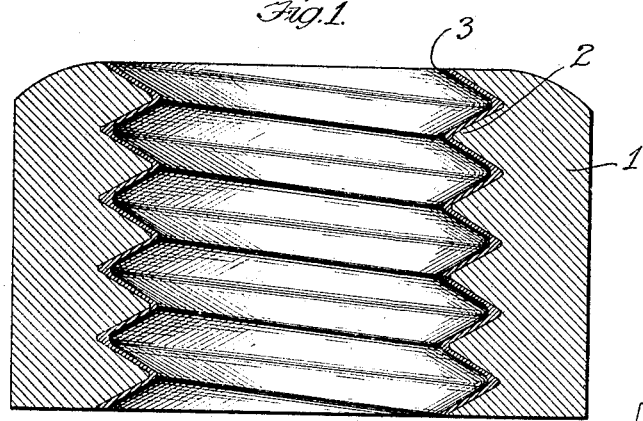
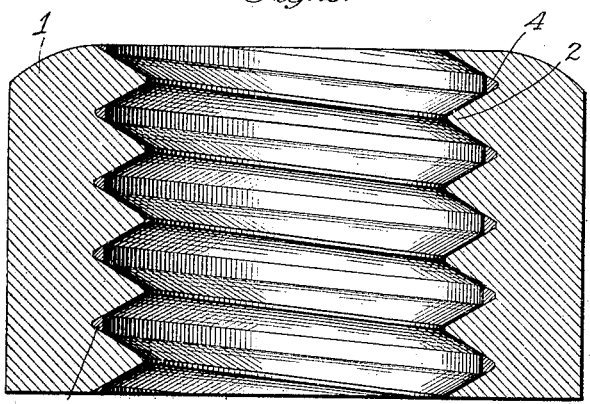
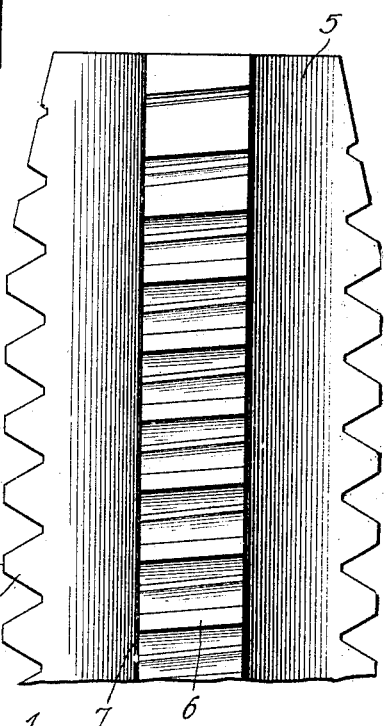
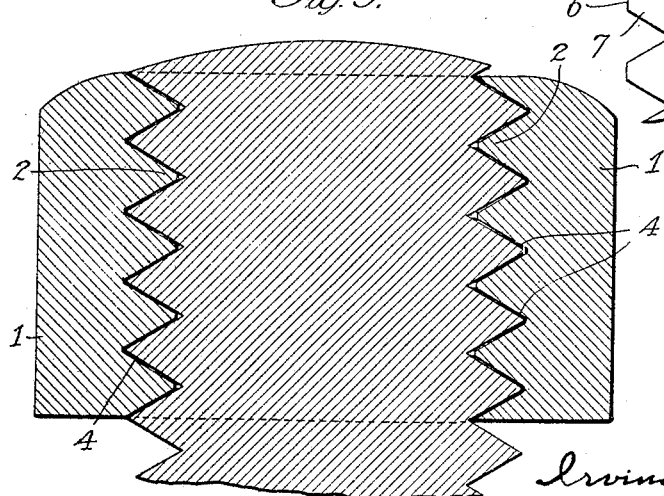
Inventor
Irving C. Woodward
By Rummler & Rummler
Attys

UNITED STATES PATENT OFFICE.

IRVING C. WOODWARD, OF CHICAGO, ILLINOIS, ASSIGNOR TO GEORGE R. TURLEY, OF CHICAGO, ILLINOIS.

NUT-LOCK.

1,368,087.  Specification of Letters Patent.  Patented Feb. 8, 1921.

Application filed February 13, 1919. Serial No. 276,802.

*To all whom it may concern:*

Be it known that I, IRVING C. WOODWARD, a citizen of the United States of America, and a resident of Chicago, county of Cook, and State of Illinois, have invented certain new and useful Improvements in Nut-Locks, of which the following is a specification.

The invention relates to lock-nuts of the general character described in Patents Nos. 1,137,941 and 1,175,034, respectively dated May 4, 1915 and March 14, 1916, and granted to the present applicant. Each of the said patents describes a threaded nut or other holding member having a thread of standard form but which is coated with a material which is relatively softer than that of which the holding member is formed. In the nut shown in Pat. No. 1,137,941, the coating of soft material is cut away from most of the convolutions of the thread excepting a few at one end of the nut. The purpose of so cutting away most of the coating of soft metal was to permit easy application of the nut to a threaded bolt while providing with such coating of soft metal which remained, means for causing the nut to firmly grip or stick to the threads of the bolt and avoid the objection of common forms of threaded holding devices, that they are liable to become accidentally jarred or vibrated loose from the coacting threaded holding member.

In Pat. No. 1,175,934, the same end was accomplished by removing the coating of soft material from one side only of the thread. This resulted in a thread having a binding surface on one side and on the other side a harder surface for receiving the reacting pressure from whatever is held in place by the nut. The coating of soft material was applied preferably by dipping the nut in some amalgam of lead, tin, or zinc, and this method of applying soft material necessitated the re-cutting of the thread to remove the excess part of the coating.

The objects of the present invention are in general the same as with the patented devices, but the desired results are attained by a somewhat simpler design, and the re-cut nut may be produced by a threading tool which departs from the normal design of threading tools but slightly.

An illustrative embodiment of the invention is shown in the accompanying drawings, in which—

Figure 1 is a sectional view of a nut showing its threads coated with a soft binding material.

Fig. 2 is another sectional view and shows the finished nut with the soft material cut away from each side of the thread but remaining only at the apex of the interdentals.

Fig. 3 is a sectional view of the finished nut as it would appear after being applied to a bolt.

Fig. 4 is a view of a portion of a tap having its teeth ground down so as to be suitable for removing from the threads of the nut the excess coating of soft material.

The objects of the invention are attained by providing a holding member such as the nut 1 with any one of the usual standard threads 2 and then coating said threads with a soft material 3 and finally cutting away most of the soft material from the sides of the thread excepting the pad portion 4 thereof forming a flat-faced interdental filling between the bases of the threads. Before the coating is applied, the nuts are cleaned by dipping in caustic soda or sulfuric acid solutions, the threads are tinned or otherwise prepared, and then the coating is applied, preferably by dipping the articles in molten soft metal. The excess coating is removed by means of a tool such as the tap 5 shown in Fig. 4. This tap, with the exception that the outer edges 6 of the teeth 7 are ground down, is identical in design with the tap which originally cut the thread 2. When the finished nut is applied to a bolt, as shown in Fig. 3, the soft metal 4 is spread apart as indicated in this figure, and due to the pressure created therein, forms a binding material offering considerable frictional resistance to removal of the nut from the bolt.

The type of thread illustrated is the U. S. standard, having a sixty-degree angle and being slightly flat at its apex and between the bases of the convolutions of the thread. The invention is carried out in the same manner as above described in connection with other types of thread wherein there is more or less flat, or in connection with rounded threads.

Although but one specific embodiment of this invention has been herein shown and described, it will be understood that numerous details of the construction shown may be altered or omitted without departing from the spirit of this invention as defined by the following claim.

I claim:

A threaded holding member of the class described, wherein the interdentals at their apices only are filled with a softer metal than that of which the body of the holding member is formed.

Signed at Chicago this 4th day of Dec., 1918.

IRVING C. WOODWARD.